United States Patent [19]

Spector

[11] Patent Number: 5,111,224
[45] Date of Patent: May 5, 1992

[54] CAMERA FOR PRODUCING PICTURES OF INDIVIDUALS JOINTLY WITH CHARACTERS

[76] Inventor: Donald Spector, 380 Mountain Rd., Union City, N.J. 07087

[21] Appl. No.: 652,003

[22] Filed: Feb. 7, 1991

Related U.S. Application Data

[63] Continuation-in-part of Ser. No. 459,642, Jan. 2, 1990, Pat. No. 4,994,832.

[51] Int. Cl.$^5$ .............................................. G03B 1/00
[52] U.S. Cl. ................................................... 354/125
[58] Field of Search ............... 354/100, 103, 108, 110, 354/111, 120, 122, 125, 126, 291, 295, 288, 354; 352/46, 55, 87, 90; 355/39

[56] References Cited

U.S. PATENT DOCUMENTS

| | | | |
|---|---|---|---|
| 4,317,626 | 3/1982 | Poshkus | 354/108 |
| 4,352,555 | 10/1982 | Dobbs et al. | 354/291 |
| 4,827,291 | 5/1989 | Guez | 354/125 |
| 4,994,832 | 2/1991 | Spector | 354/110 |

Primary Examiner—L. T. Hix
Assistant Examiner—David M. Gray
Attorney, Agent, or Firm—Michael Ebert

[57] ABSTRACT

A camera for producing a picture in which an individual whose picture is taken is seen jointly with a figurative character in such a way as to establish an apparent relationship therebetween. The camera is loaded with a dual track film having a picture track and a parallel guide track. The picture track is formed by a series of light-sensitive picture frames each being partially pre-exposed to create a latent image thereon of a character at a predetermined position within the frame. The guide track has a series of transparency viewfinder frames each having a printed image thereon corresponding to the latent image on the adjacent picture frame. The camera includes an exposure section provided with a lens and a shutter, the picture track being advanceable through this section. And it also includes a viewfinder section through which is advanceable the guide track. When the camera is set for taking a picture, a particular picture frame is then in place for exposure in the exposure section and the operator can then view through the viewfinder section the individual whose picture is to be taken in juxtaposition to the printed image on the corresponding viewfinder frame. When, therefore, the shutter is actuated by the operator, a picture is taken in which the individual appears in juxtaposition to the character.

7 Claims, 1 Drawing Sheet

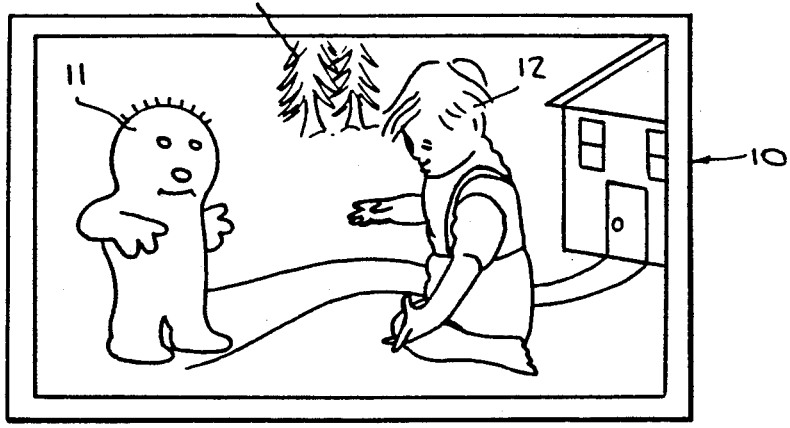
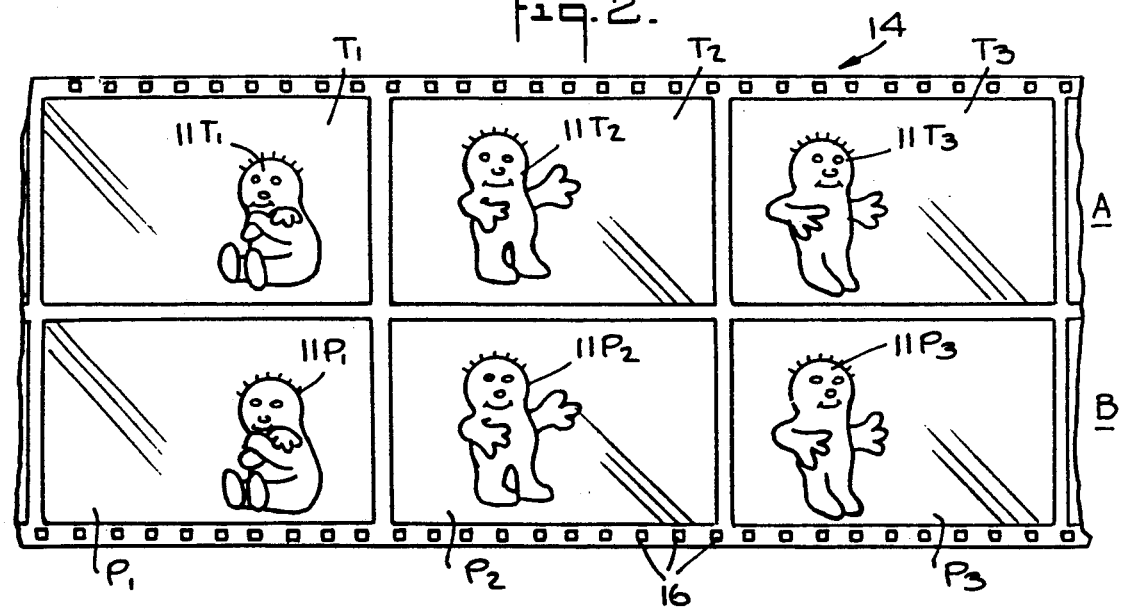
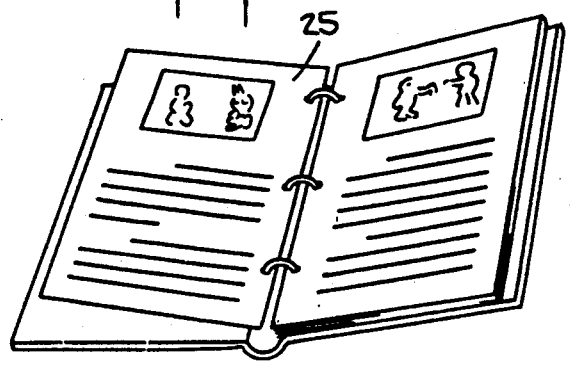
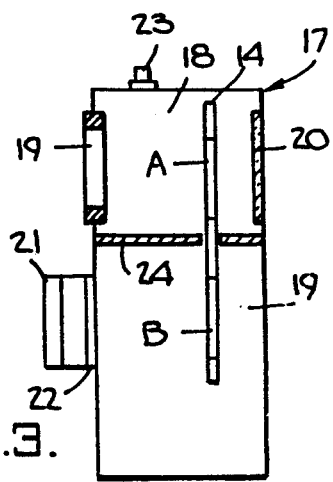

CAMERA FOR PRODUCING PICTURES OF INDIVIDUALS JOINTLY WITH CHARACTERS

RELATED APPLICATION

This application is a continuation-in-part of my copending application Ser. No. 459,642, filed Jan. 2, 1990, now U.S. Pat. No. 4,994,832 entitled "Photographic Technique for Producing Pictures of Individuals Jointly with Characters," the entire disclosure of which is incorporated herein by reference.

BACKGROUND OF THE INVENTION

1. Field of Invention

This invention relates generally to photography, and in particular to a technique and a camera based thereon in which the camera is loaded with a dual-track film having a picture track whose successive light-sensitive picture frames are partially pre-exposed to contain latent images thereon of figurative characters and a parallel guide track whose successive viewfinder frames are transparencies having printed images therein corresponding to the latent images, whereby when individuals are then seen through the viewfinder of the camera and photographed, the individuals appear in the resultant pictures in juxtaposition to the characters so as to establish an apparent relationship therebetween.

2. Status of Prior Art

A camera consists essentially of a light-proof enclosure housing a light-sensitive film and provided with a lens to admit light and focus it on the film. In a standard commercial camera, an adjustable diaphragm is included as well as a shutter and a viewfinder. The diaphragm can be adjusted to vary the diameter of the lens aperture and hence the amount of admitted light. The shutter acts to control the length of time the film is exposed to light.

Low-cost, disposable cameras are now available which contain a film cartridge whose successive frames are advanced relative to a fixed focus lens after each picture is taken. When all frames have been exposed, the cartridge is then removed from the body of the camera which is discarded. Such disposable cameras are particularly popular with young children; for to operate the camera no training or skill is required, and all the child need do is to compose a picture through the viewfinder and then snap it.

In the contemporary world, characters such as Mickey Mouse hold great fascination for children. The term "character" ordinarily refers to a person in the cast of a drama or novel. But as the term is now popularly employed in the field of toys and playthings, it applies to a humanoid or animal-like figure that originated in a comic strip, a motion picture or a TV program and has since acquired the status of a recognized personality. Thus Donald Duck and Mickey Mouse are internationally known characters, as are the figures who populate the Sesame Street TV series for children.

Perhaps the most acclaimed tourist attraction in the United States is Disney World in Orlando, Florida. One reason why cameras are omni-present at this resort is that actors disguised and dressed up as Disney characters roam the grounds and play with the children. These characters also pose with the children so that pictures can be taken of, say, a man-sized Mickey Mouse embracing a 6-year-old child. Such pictures are treasured by children, for they establish a special relationship between the child and the character.

The line of demarcation between reality and imagination is not sharply drawn in a typical child. Some children look upon characters who people their imagination not as cardboard or synthetic figures but as living creatures. Hence a child may shower as much affection on a Minnie Mouse soft doll as on a dog or cat. But what children cannot presently do, unless at Disney World, is to take pictures in which they appear together with their favorite character.

In my above-identified copending application, there is disclosed a photographic technique for producing a picture in which an individual whose picture is taken is seen jointly with a figurative character in such a way as to establish an apparent relationship therebetween. To carry out this technique, a camera is loaded with a light-sensitive film whose successive frames are partially pre-exposed so that each frame contains a latent image of a character.

When the camera is set to place a particular film frame behind the lens, the individual is then posed before the camera to occupy a predetermined position relative to the latent frame image. Upon actuation of the camera, a latent image of the individual is formed on the frame in juxtaposition to that of the character and the exposure of the frame is completed. The film is then developed and printed to provide the desired picture.

The camera disclosed in my copending application is provided with a viewfinder having a channel therein to receive a guide strip carrying a series of slide transparencies corresponding to the series of pre-exposed frames on the camera film. Each slide has a printed image thereon which when the image is within the viewfinder corresponds to a latent image on the film frame to which the camera is then set. When, therefore, the operator who is about to take a picture by completing the exposure of the partially-expose film frame looks through the viewfinder he can then compose the picture by posing the individual in the scene to be photographed so that the individual has the desired interactive relationship with the character.

The practical difficulty with my earlier viewfinder arrangement is that the operator must not only be supplied with a cartridge or reel containing the partially exposed film having latent images thereon, but he must also be supplied with the guide strip. And he must be sure that the selected guide strip slide in the viewfinder corresponds to the film frame then in operative position within the camera.

While this camera may be of the low-cost, disposable type, the need for a special viewfinder to accommodate the guide strip adds to the cost of the camera, and whether the pictures taken are the pictures intended depends on the ability of the operator to coordinate the position of the guide strip in the viewfinder with the film frame then in operative position in the camera. If, therefore, there is a mismatch between the printed image seen through the viewfinder and the latent image in the film frame, the individual photographed may appear superimposed over the character rather than adjacent the character.

SUMMARY OF INVENTION

In view of the foregoing, the main object of this invention is to provide a camera for producing a picture in which an individual whose picture is taken is seen together with a figurative character in such a way as to establish an apparent relationship therebetween, the camera including an exposure section and a viewfinder section.

More particularly, an object of this invention is to provide a dual-track film for a camera of the above type in which one track which is advanceable through the exposure section of the camera has successive light-sensitive picture frames that are partially pre-exposed to contain a latent image of a character, the other track which is advanceable through the viewfinder section having successive tranparency viewfinder frames having printed images therein corresponding to the latent images in the picture frames.

A significant advantage of the invention is that an operator of the camera, in viewing through the viewfinder section an individual to be photographed, sees this individual in juxtaposition to a printed character image, so that when a picture is taken the latent, partially-exposed character image is then fully exposed and the resultant picture shows the individual in proper juxtaposition to the character.

Briefly stated, these objects are attained in a camera for producing a picture in which an individual whose picture is taken is seen jointly with a figurative character in such a way as to establish an apparent relationship therebetween. The camera is loaded with a dual track film having a picture track and a parallel guide track. The picture track is formed by a series of light-sensitive picture frames each being partially pre-exposed to create a latent image thereon of a character at a predetermined position in the frame. The guide track has a series of transparency viewfinder frames each having a printed image thereon corresponding to the latent image on the adjacent picture frame.

The camera includes an exposure section provided with a lens and a shutter, the picture track being advanceable through this section. And it also includes a viewfinder section through which is advanceable the guide track. When the camera is set for taking a picture, a particular picture frame is then in place for exposure in the exposure section and the operator can then view through the viewfinder section the individual whose picture is to be taken in juxtaposition to the printed image on the corresponding viewfinder frame. When, therefore, the shutter is actuated by the operator, a picture is taken in which the individual appears in juxtaposition to the character.

BRIEF DESCRIPTION OF DRAWINGS

For a better understanding of the invention as well as other objects and further features thereof, reference is made to the following detailed description to be read in conjunction with the accompanying drawings, wherein:

FIG. 1 illustrates a picture taken by a photographic technique in accordance with the invention;

FIG. 2 shows a dual-track film for use in a camera in accordance with the invention;

FIG. 3. schematically illustrates a camera having a viewfinder section and an exposure section in accordance with the invention for receiving the dual track film; and FIG. 4 is a book whose pages are illustrated by pictures produced by a technique in accordance with the invention and an accompanying text.

DESCRIPTION OF INVENTION

Referring now to FIG. 1, there is shown the print 10 of a picture taken by a camera in accordance with the invention. The picture includes a fanciful humanoid character 11, and an individual 12 who is so posed as to be seen in apparent dialogue with the character in a setting that includes a tree 13.

The dual-track film 14 used for this purpose which is illustrated in FIG. 2, may be in cartridge, reel or in any other conventional form. The film is provided along its upper and lower margins with sprocket holes 15 and 16 so that the film may be advanced in the camera by turning a sprocket wheel, as in conventional cameras.

Dual track film 14 is provided with a lower picture track B constituted by a series of light-sensitive picture frames $P_1$, $P_2$, $P_3$ etc., each of which is partially pre-exposed to produce a latent image of character 11. Frame $P_1$ has a latent image $11P_1$ of character 11 in one pose, frame $P_2$ having a latent image $11P_2$ of the character in another pose and frame $P_3$ having a latent image $11P_3$ of the character in still another pose. It is essential that each picture frame be only partially pre-exposed (i.e., half a normal full exposure) so that the same frame remains sensitive to light and can be further exposed to photograph an individual to produce a picture in which the individual is seen in juxtapsition to the character.

Assuming a film cartridge having a capacity of twelve frames and further assuming that the cartridge is intended to establish a relationship between a character, such as Garfield or Mickey Mouse, with a given individual or with several individuals in different situations, then the character whose latent image is contained in each frame will be photographed in a different pose in each frame at a predetermined position within the frame.

For this purpose, the character photographed is preferably not in two dimensional cartoon form, but is a three-dimensional, large scale effigy, so that his relationship with the individual appearing in the same photograph is more realistic. Thus for a Mickey Mouse character, one can use a large size Mickey Mouse doll whose arms and legs and all other movable members are adjustable so that the doll can be made to assume different expressive postures.

Parallel to lower picture track B on film 14 is an upper guide track A having a series of transparency viewfinder frames $T_1$, $T_2$, and $T_3$, etc., thereon corresponding to the series of picture frames in track B. Each viewfinder frame in track A is effectively a transparency slide containing a printed image of the character that is the same both in pose and placement as the latent image on the adjacent picture frame on picture track B. Thus character $11T_1$ in track A is identical to character $11P_1$ in track B, this being true of the relationship between characters $11T_2$-$11P_2$ and $11T_3$-$11P_3$.

As shown in FIG. 3, the camera 17 which is adapted to operate with dual track film 14 includes an upper viewfinder section 18 provided at its front end with a viewfinder 19 and at its rear end with a window 20. Below viewfinder section 18 is an exposure section 19 having at its front end a camera lens 21 and a shutter mechanism 22 operated by an actuator button 23 at the top of the camera. The sections are separated by a partition 24.

Film 14 is advanceable in camera 17 by a conventional drive mechanism for this purpose, the film passing through a slot in partition 24 which is light-sealed, so that track A on the film advances through viewfinder section 18 and track B through exposure section 19, no light from the viewfinder section entering the exposure section. An operator looking through window 20 would see the individual to be photographed within the confines of viewfinder 19.

When a camera is set to take a picture, a particular latent image picture frame in track B will then be in operative relation to the exposure section 19 to camera lens 21. At the same time the corresponding printed image viewfinder frame in track A will be interposed between window 20 and viewfinder 19 in the viewfinder section. Hence the operator will see in the viewfinder the individual to be photographed in juxtaposition to the printed image, and he can so train the camera as to establish a desired relationship between the individual and the character. The operator can make his own choice as to how the individual being photographed is to interact with the character.

When, therefore, the operator is satisfied with this relationship, he then actuates the shutter button 23 to take a picture. Since the picture frame in track B is pre-exposed, usually to about one-half its normal full exposure period for taking a picture, and the exposure of the film is completed when taking a picture of an individual, the resultant picture would under ordinary circumstances be somewhat underexposed. But by the use of a film of the appropriate sensitivity, the underexposure can be compensated for to provide a picture of acceptable quality.

After a first picture is taken, then film 14 is advanced by the operator to take another picture in which the individual can be posed in the manner appropriate to the character in the printed image in the viewfinder frame then in operative position in the viewfinder section. When all picture frames are exposed, the film can then be removed from the camera for development and printing in the usual manner.

In practice, consumers may be provided with a large choice of pre-exposed film cartridges or reels having different characters therein, and guide tracks having viewfinder frames appropriate thereto. When pictures are produced showing a child in a series of poses with a given character, one can paste or otherwise attach these pictures on different pages 25 of a loose leaf book, as shown in FIG. 4. The child can type or write on these pages a story of his own creation giving an account of adventures or events illustrated in the pictures. In this way, the child can produce a highly personalized story involving himself and the character.

While there has been shown and described a preferred embodiment of a photographic technique and a camera based thereon for producing pictures of individuals jointly with characters in accordance with the invention, it will be appreciated that many changes and modifications may be made therein without, however, departing from the essential spirit thereof.

I claim:

1. A technique for producing photographic pictures in each of which an individual whose picture is taken is seen jointly with a figurative character in such a way as to establish an apparent relationship therebetween, said technique comprising:

(a) loading a camera having a viewfinder with a dual track film provided with a picture track whose successive light-sensitive picture frames are partially pre-exposed so that each picture frame contains a latent image of a character at a predetermined position within the frame, said film having a parallel guide track which is interposed between the viewfinder and the eye of the operator and whose successive viewfinder frames are constituted by transparencies of printed images corresponding to the latent images on the picture frames;

(b) taking pictures with the loaded camera of an individual to expose the successive picture frames so that in each picture frame a latent image of the individual seen through the viewfinder appears in juxtaposition with that of the latent image of the character in the picture frame in a position to be exposed which is then completely exposed; and (c) developing and printing the exposed film to provide pictures in each of which the individual appears next to the character.

2. A camera for producing pictures in each of which an individual whose picture is taken is seen jointly with a figurative character in such a way as to establish an apparent relationship therebetween, said camera being loaded with a dual-track film having a picture track whose series of light-sensitive picture frames are partially pre-exposed so that each picture frame contains a latent image of the character at a predetermined position, said film having a guide track whose series of viewfinder frames are each formed by a transparency having a printed image therein corresponding to the latent image of the adjacent picture frame in the picture track, said camera being provided with a viewfinder behind which said guide track is advanceable, said camera including a lens and shutter means behind which said picture track is advanceable whereby when the shutter means of the camera is actuated to take a picture on a particular picture frame of an individual then seen through the viewfinder, the picture frame is then exposed to sufficient light to complete the exposure thereof.

3. A camera as set forth in claim 2, wherein said camera includes an exposure section through which said picture track is advanceable, and a separate viewfinder section through which said guide track is advanceable.

4. A camera as set forth in claim 3, in which said shutter means is disposed in said exposure section in cooperative relation to said camera lens and is provided with a shutter actuator.

5. A camera as set forth in claim 3, in which said viewfinder section includes at one end thereof a viewfinder and at the other end a window, the guide track passing between the viewfinder and the window.

6. A camera as set forth in claim 2, in which the dual-track film is provided with marginal sprocket holes.

7. A camera as set forth in claim 3, in which the exposure section is separated by a partition from the viewfinder section, and the film which is advanced through the camera is so disposed that its picture track is below the partition and its viewfinder track is above the partition, the partition having a light-shielded slot to admit the film.

* * * * *